(12) United States Patent
Koto et al.

(10) Patent No.: US 6,816,777 B2
(45) Date of Patent: Nov. 9, 2004

(54) ELECTRONIC CONTROL SYSTEM EXPEDITING FLOATING POINT PROCESSING

(75) Inventors: Kazuhiro Koto, Kariya (JP); Tadaharu Nishimura, Obu (JP)

(73) Assignee: Denso Corporation, Kariya (JP)

( * ) Notice: Subject to any disclaimer, the term of this patent is extended or adjusted under 35 U.S.C. 154(b) by 38 days.

(21) Appl. No.: 10/337,854

(22) Filed: Jan. 8, 2003

(65) Prior Publication Data

US 2003/0135322 A1 Jul. 17, 2003

(30) Foreign Application Priority Data

Jan. 15, 2002 (JP) .................................... 2002-006057
Nov. 13, 2002 (JP) .................................... 2002-329588

(51) Int. Cl.[7] .......................... G06G 7/70; G06F 19/00
(52) U.S. Cl. ...................... 701/114; 73/116; 73/117.3; 701/102; 701/110; 701/111; 701/115
(58) Field of Search ................................. 701/111, 114, 701/115, 102, 110; 73/116, 117.3

(56) References Cited

U.S. PATENT DOCUMENTS

| | | | |
|---|---|---|---|
| 5,201,296 A | * | 4/1993 | Wunning et al. ........... 123/479 |
| 6,082,187 A | * | 7/2000 | Schricker et al. ............. 73/116 |
| 6,175,911 B1 | * | 1/2001 | Oberman et al. ........... 712/221 |
| 6,199,007 B1 | * | 3/2001 | Zavarehi et al. ............ 701/111 |
| 6,216,061 B1 | * | 4/2001 | Franke et al. .................. 701/1 |
| 6,393,554 B1 | * | 5/2002 | Oberman et al. ........... 712/221 |
| 6,603,481 B1 | * | 8/2003 | Kawai et al. ................ 345/505 |
| 6,714,197 B1 | * | 3/2004 | Thekkath et al. ........... 345/427 |
| 2001/0005808 A1 | | 6/2001 | Kawai et al. ............... 701/114 |

FOREIGN PATENT DOCUMENTS

| | | |
|---|---|---|
| JP | B2-H6-19740 | 3/1994 |
| JP | A-2001-138758 | 11/1999 |

* cited by examiner

Primary Examiner—Willis R. Wolfe
Assistant Examiner—Johnny H. Hoang
(74) Attorney, Agent, or Firm—Nixon & Vanderhye P.C.

(57) ABSTRACT

A computation processing is repeatedly executed in a control program. In the processing, a preceding computation result RamA that is represented as a floating point mode is used for computation of a current result RamA. Whether the preceding computation result RamA is either of non-numeral and infinity is determined. When the preceding computation result RamA is either non-numeral or infinity, the processing does not proceed to next computation but substitutes a default value for a variable RamA. Here, the processing substitutes a target value for the variable RamA if the variable RamA has a characteristic of converging on the target value in the computation processing.

11 Claims, 6 Drawing Sheets

FIG. 3A
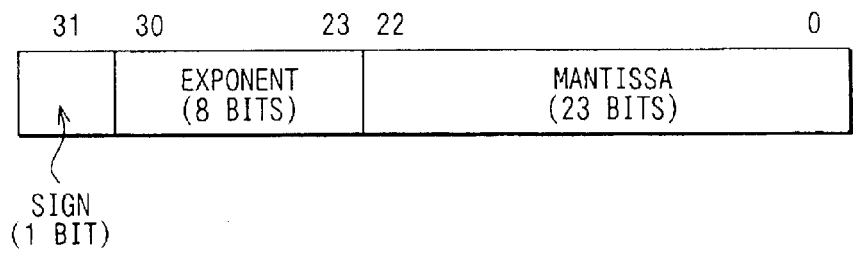
FIG. 3B
| EXPONENT | MANTISSA | MEANING |
|---|---|---|
| 255 | OTHER THAN 0 | NON-NUMERAL |
| | 0 | $+\infty, -\infty$ |
FIG. 4
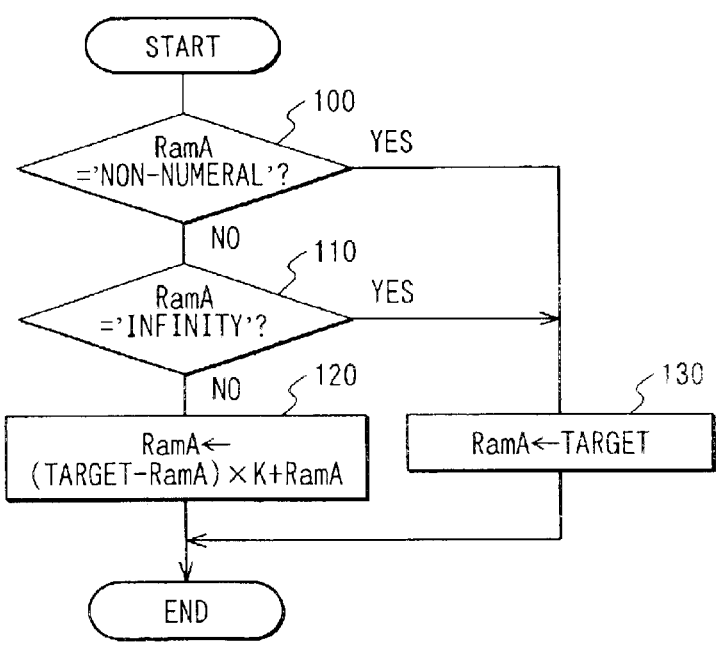

ELECTRONIC CONTROL SYSTEM EXPEDITING FLOATING POINT PROCESSING

CROSS REFERENCE TO RELATED APPLICATIONS

This application is based on and incorporates herein by reference Japanese Patent Applications No. 2002-6057 filed on Jan. 15, 2002 and No. 2002-329588 filed on Nov. 13, 2002.

FIELD OF THE INVENTION

The present invention relates to an electronic control system equipped with floating point processing function, in which each computation result is replaced with a default value for expediting the floating point processing when it is determined to be 'non-numeral' or 'infinity.'

BACKGROUND OF THE INVENTION

Recent electronic control units (ECUs) for vehicles or the like are equipped with floating point processing units (FPUs). Use of the FPU enables computation of a floating point mode datum to obtain a higher precision computation result in comparison with use of a fixed point mode datum.

The floating point computation is well known and its datum format is specified in various standards. For instance, a datum format of a single-precision floating point mode compliant with IEEE 754 is composed of a 1-bit sign part, 8-bit exponent part, and 23-bit mantissa part. The total four byte datum possesses a seven digit resolution. The floating point mode datum can represent, as a 'non-numeral,' a computation result that cannot be represented as a numeral such as a '0/0' and '+∞-∞.' For instance, in the above standard, if a datum has a mantissa part of other than '0' and an exponent part of all eight bits to be '1', the datum is treated as a 'non-numeral.' This kind of 'non-numeral' datum format may appear due to noise. Namely, when the noise forces all the exponent part to be changed to '1' with the mantissa part being other than '0', the datum is treated as a 'non-numeral.'

Once the 'non-numeral' appears, a computation result using the 'non-numeral' naturally becomes 'non-numeral.' The 'non-numeral' must be therefore rewritten to a normal value. To solve this issue, the following two well-known methods are used.

Method (1): An entire area storing floating point mode data are searched for a 'non-numeral' using timer interruption and a default value is substituted for the 'non-numeral' when the 'non-numeral' is found.

Method (2): Similarly to the above method (1), an entire area storing floating point mode data are searched for a 'non-numeral' and a CPU is reset to initialize all the floating point mode data using an initializing routine when the 'non-numeral' is found.

The above method (1) adversely affects a memory area. Specifically, reasons will be explained by referring to the following computation types.

Computation (1): A+B→C, where the sum of A and B is substituted for C.

When a computation result C becomes 'non-numeral,' other computation results using C become 'non-numeral.' However, when neither A nor B becomes 'non-numeral' thereafter, C returns to a normal numeral in the following computation. Hence, C and a computation result using C naturally return to the normal value for a short interval.

Computation (2): A+B→A, where the sum of A and B is substituted for A.

When a computation result A becomes 'non-numeral,' other computation results using A become 'non-numeral.' Here, in a subsequent computation using A, a result thereby becomes 'non-numeral' and never returns to a normal value. Hence, A and a computation result using A never returns to the normal value.

As explained in the computation (2), where a preceding result is used for a current computation, appearance of a 'non-numeral' poses issues on the computation.

The method (1) that substitutes a default value involves a sizable memory area for storing default values of floating point mode data to be substituted for 'non-numeral' computation results. The default values must be prepared and stored even for computation results that will naturally return to the normal values in the computation (1).

The method (2) that resets a CPU adversely affects reliability of controlling a system due to suspending operation of a running system even if it is suspended for any short period.

The above issues result from not only a 'non-numeral' but also an 'infinity.' For instance, in the IEEE 754 specification, if a four byte datum has a mantissa part to be '0' and an exponent part of all eight bits to be '1', the datum is treated as an 'infinity.'

SUMMARY OF THE INVENTION

It is an object of the present invention to provide an electronic control system capable of shortly returning a non-numeral or an infinity value of a floating point mode datum to a normal value.

To achieve the above and other objects, an electronic control system is programmed as follows: Repetitive computation is executed in the control program. In the computation, a floating point mode datum is used and a preceding computation result of the floating point mode datum is used for computing a current computation result. Whether the computation result is non-numeral is determined. When the computation result is determined to be non-numeral, a default value is substituted for the computation result of the non-numeral.

In one embodiment, whether a computation result is infinity is determined. When the result is determined to be infinity, a default value is substituted for the computation result of the infinity value.

The above processing enables the electronic control system to return a non-numeral or an infinity value of a floating point mode datum to a normal value with no impact on a memory area and no suspension of operation of a running system. This thereby ensures high reliability on controlling the system.

BRIEF DESCRIPTION OF THE DRAWINGS

The above and other objects, features and advantages of the present invention will become more apparent from the following detailed description made with reference to the accompanying drawings. In the drawings:

FIGS. 3A and 3B are schematic diagrams explaining floating point mode data of IEEE 754 standard;

FIG. 4 is a flowchart of check processing of the embodiment;

DETAILED DESCRIPTION OF THE PREFERRED EMBODIMENTS

Figure 1:
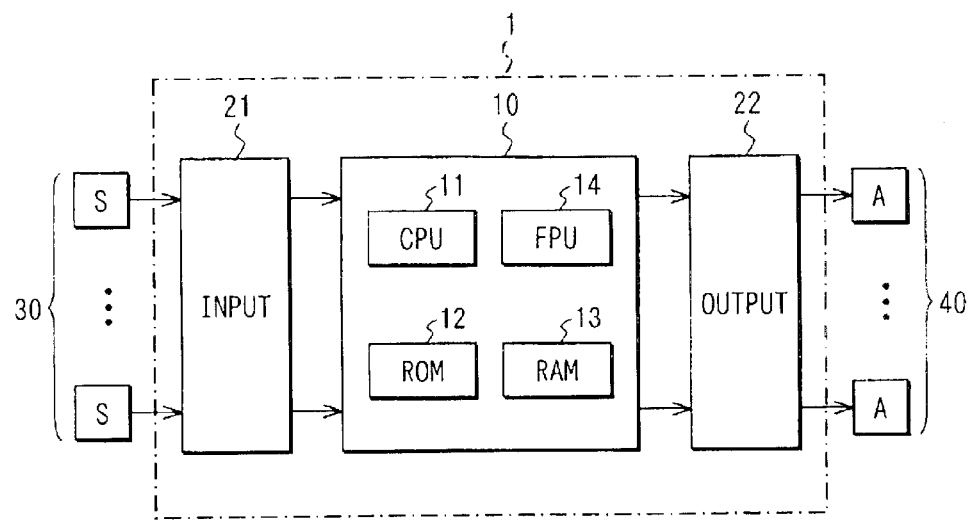
FIG. 1 is a schematic structural block diagram of an engine electronic control unit (engine ECU) of an embodiment of the present invention.

An engine electronic control unit (engine ECU) explained as an embodiment of the present invention is for controlling an internal combustion engine. Referring to FIG. 1, the engine ECU 1 is equipped with sensors 30, an input circuit 21, a microcomputer 10, an output circuit 22, and actuators 40. The sensors 30 are for detecting various running states of an engine. They include a rotation angle sensor that outputs a pulse signal at every preset angled rotation of an engine crank shaft, and a base position sensor that outputs a pulse signal every time a specified engine cylinder piston reaches a preset position, e.g., a top dead center. Furthermore, they include a water temperature sensor that detects a temperature of engine cooling water, and an oxygen concentration sensor that measures an oxygen concentration in the exhaust gas. The input circuit 21 is for inputting the sensor signals from the sensors 30 to execute analog/digital conversion or waveform shaping. The microcomputer 10 is for executing various processing for controlling the engine based on the sensor signals from the input circuit 21. The output circuit 22 is for driving the actuators 40 based on control data from the microcomputer 10. The actuators 40 include injectors and an igniter provided in the engine.

The microcomputer 10 includes a well-known CPU 11, ROM 12, RAM 13, floating point processing unit (FPU) 14, and other components (not shown) such as inputs/outputs, registers, and free-run counters. The FPU 14 is for executing floating point computation and the RAM is for storing computation results and others.

The engine ECU 1 thus executes engine control processing of driving actuators 41 connected with the output circuit 22 based on the signals inputted from the sensors 30 through the input circuit 21. The engine control is executed based on a program stored in the ROM 12 and capable of high precision control with floating point computation using the FPU 14.

Figure 2:
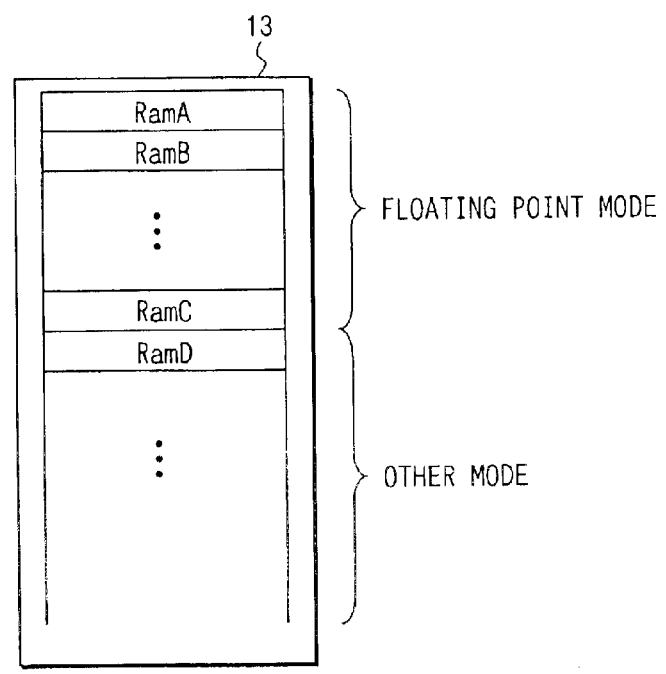
FIG. 2 is a schematic diagram explaining floating point mode data stored in a RAM.

The floating point computation uses floating point mode data for which a storage area is reserved in the RAM 13 as shown in FIG. 2. Here, variables of RamA, RamB, through RamC are floating point mode data, and variables of RamD and below RamD are other mode data.

The floating point mode datum is well-known to those skilled in the art and its datum format is specified in various standards. For instance, a datum format of a single-precision floating point mode compliant with IEEE 754 is composed of a 1-bit sign part, 8-bit exponent part and 23-bit mantissa part as shown in FIG. 3A. The total four byte datum possesses a seven-digit resolution.

The floating point mode datum can represent 'non-numeral' or 'infinity', neither of which can be represented as a numeral, as shown in FIG. 3B. That is 'non-numeral' is represented by an exponent part of all eight bits to be '1', '255' in decimal notation, and a mantissa part of other than '0,' and 'infinity' is represented by an exponent part of all eight bits to be '1' and a mantissa part of '0.'

These 'non-numeral' and 'infinity' may appear through rewriting all the exponent part bits to '1' due to noise during computation or reading out data from the storage area.

There is a computation processing that is repeatedly executed in a control program and in which a preceding computation result is used for computation of a current result. In the computation processing, once the computation result that has a floating point datum mode becomes 'non-numeral' or 'infinity', a computation result using the 'non-numeral' or 'infinity' naturally becomes 'non-numeral' thereafter. An abnormal state thereby continues in the subsequent computation results.

As an instance of the above, a smoothing type computation is referred to. It is computation processing that makes a variable RamA, representing a computation result of a floating point mode datum, follow up a target value. It is shown in formula (1).

$$\text{`}RamA = (\text{target value} - RamA) \times K + RamA\text{'} \tag{1}$$

Here, a symbol '=' means that a right side result is substituted for a left side. A constant K is a smoothing coefficient. A preceding computation result RamA that is in the right side is used for computation of a current result that is in the left side. Therefore once the variable RamA becomes 'non-numeral' or 'infinity,' the subsequent computation results become 'non-numeral' or 'infinity.'

In the present embodiment, check processing is added for the above computation in which the preceding computation result is used for computation of the current computation result.

Referring to FIG. 4, in the check processing, at first it is determined whether a variable RamA is 'non-numeral' at step 100. Since the variable RamA is a single-precision floating point mode datum compliant with the IEEE 754 standard, 'non-numeral' has an exponent part of decimal '255' and a mantissa part of other than '0.' When the variable RamA is determined to be 'non-numeral' (YES at step 100), the processing proceeds to step 130. When the variable RamA is determined to be not 'non-numeral' (NO at step 100), the processing proceeds to step 110.

At step 110, it is determined whether the variable RamA is 'infinity' at step 110. Since the variable RamA is the single-precision floating point mode datum compliant with the IEEE 754 standard, 'infinity' has an exponent part of decimal '255' and a mantissa part of '0'. When the variable RamA is determined to be 'infinity' (YES at step 110), the processing proceeds to step 130. When the variable RamA is determined to be not 'infinity' (NO at step 110), the processing proceeds to step 120. At step 120, since the variable RamA is neither 'non-numeral' nor 'infinity,' the computation shown in formula (1) is executed and the check processing is terminated.

By contrast, at step 130, a target value is substituted for the RamA and the check processing is then terminated. The target value can be substituted since the computation shown in formula (1) is the smoothing computation where the computation result converges on the target value. When no target value exists, a fixed default value can be substituted.

As explained above, by executing the check processing the floating point mode datum that represents 'non-numeral' or 'infinity' can be returned to a normal value for a short period.

Addition of the check processing enables a memory area not to prepare default values for all the floating point mode data stored in the RAM 13 unlike a memory area for processing using the above described method (1). In the method (1), the entire memory area of the RAM 13 is, all at once, searched for 'non-numeral' and then each searched 'non-numeral' must be replaced with each default value. The memory area of the RAM 13 must thereby reserve default values corresponding to the floating point mode data. On the other hand, the addition of the check processing involves no impact on the memory area, unlike the method (1), and no running-engine suspension that does not lower reliability of the engine unlike the method (2).

In smoothing type processing where a computation result follows up a target value, the target value is used as the default value. Thereby a reasonable control is expected in comparison with a case where a fixed value is used as the default value. If the target value computed by the control program is used, the memory area needs not to reserve the fixed value as the default and unlikely suffers memory shortage.

Figure 6:
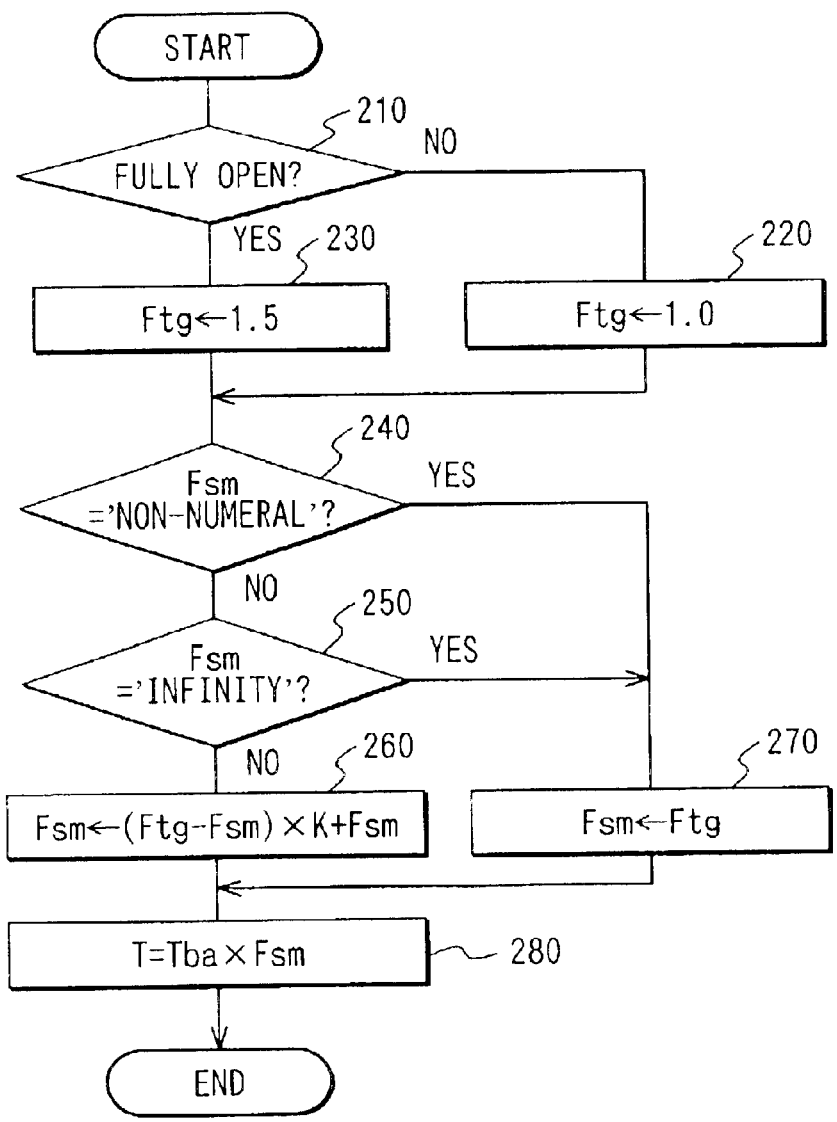
FIG. 6 is a flowchart of correction processing of an injection amount executed in the engine ECU.

Furthermore, to clarify the above effect in FIG. 4, fuel injection amount correction processing will be described referring to FIG. 6. It is executed in the engine ECU 1 of the present embodiment. It computes a fuel injection amount T that is used for driving an injector and executed every constant interval. The fuel injection amount T is computed by multiplying a basic fuel injection amount Tba, which are computed in another processing of the control program, by a correction factor Fsm. In addition, in the processing, by a computation shown in formula (2) a correction coefficient Fsm is to be slowly converged on a target value Ftg that is set in one of two values depending upon whether a throttle valve of the engine is fully open.

$$\text{'}Fsm=(Ftg-Fsm) \times K+Fsm\text{'} \qquad \text{Formula (2)}$$

In the Formula (2), the Fsm and Ftg are substituted for the RsmA and target value in the Formula (1), respectively. Data of the T, Tba, Fsm, and Ftg are represented in single-precision floating point modes compliant with the IEEE 754.

Upon starting of the fuel injection amount correction processing, it is determined whether the throttle valve is fully open at step 210. At the negative determination at step 210 the processing proceeds to step 220, and the Ftg is set to a normal value (in this example, 1.0). At the affirmative determination at step 210 the processing proceeds to step 230, and the Ftg is set to a greater value (in this example 1.5) than the above normal value.

Upon setting the Ftg at steps 220 and 230, the processing proceeds to step 240 and determines whether the Fsm is 'non-numeral.' Similarly to step 100 in FIG. 4, when an exponent part of the Fsm is '255' and a mantissa part is other than '0,' the Fsm is determined to be 'non-numeral.'

The Fsm is determined to be 'non-numeral' (YES at step 240), so that the processing proceeds to step 270. The Fsm is determined to be not 'non-numeral' (NO at step 240), so that the processing proceeds to step 250.

At step 250, it is determined whether the Fsm is 'infinity.' Similarly to step 110 in FIG. 4, when an exponent part of the Fsm is '255' and a mantissa part is '0,' the Fsm is determined to be 'infinity.'

The Fsm is determined to be 'infinity' (YES at step 250), so that the processing proceeds to step 270. The Fsm is determined to be not 'infinity' (NO at step 250), so that the processing proceeds to step 260.

When the Fsm is thus determined to be neither 'non-numeral' nor 'infinity,' the processing proceeds to step 260. At step 260, a current Fsm is computed by using the smoothing processing of the Formula (2). When the Fsm is determined to be either 'non-numeral' or 'infinity,' the processing proceeds to step 270. At step 270, a target value Ftg is substituted for the Fsm. Here, the substituted Ftg is the same value set at step 220 or step 230. (i.e., 1.0 or 1.5)

Upon completing processing at step 260 or at step 270, the processing proceeds to step 280 and the fuel injection amount T is computed from the basic fuel injection amount Tba and the correction coefficient Fsm using a Formula (3) shown below to terminate the correction processing.

$$\text{'}T=Tba \times Fsm\text{'} \qquad \text{Formula (3)}$$

The target value behavior in the correction processing is shown in broken lines in FIGS. 7A to 7C and FIGS. 8A to 8C. When the throttle valve is determined to be fully open (YES at step 210), a target value Ftg of the correction coefficient Fsm is increased from 1.0 to 1.5 (increasing correction) at step 230 and the fuel injection amount T is increased more than that in a normal state. When the throttle valve is determined to be not fully open (NO at step 210), the Ftg is returned from 1.5 to 1.0 at step 220 and the increase correction of the fuel injection amount T is thereby cancelled.

Figure 7A:
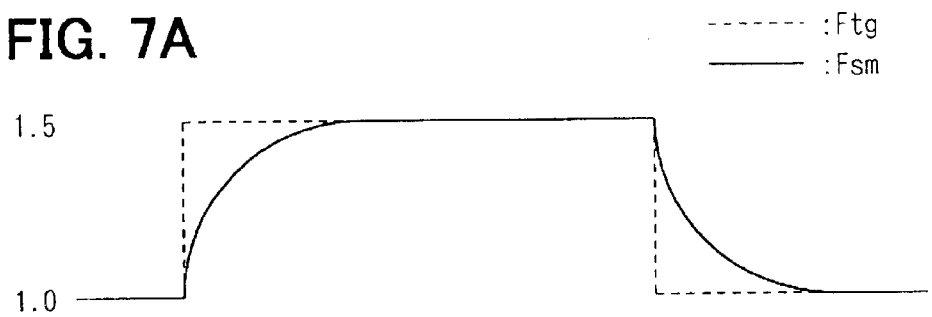
FIGS. 7A, 7B and 7C are diagrammatic graphs explaining correction processing of an injection amount.
Figure 8A:
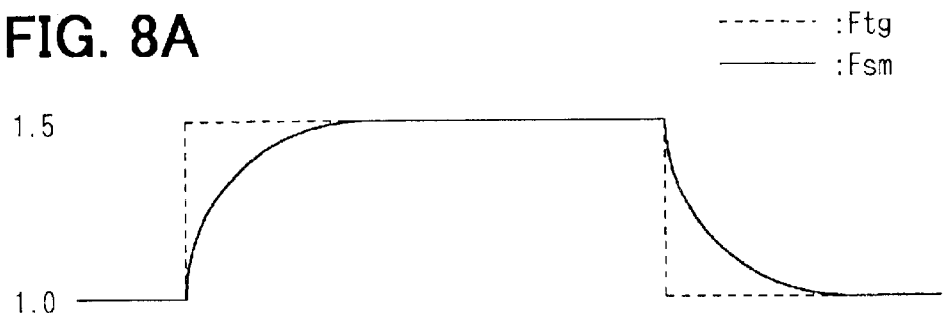
FIGS. 8A, 8B and 8C are diagrammatic graphs explaining correction processing of an injection amount.

As shown in solid lines in FIG. 7A or FIG. 8A, by using the smoothing processing at step 260 the correction coefficient Fsm slowly follows the target value Ftg so that the fuel injection amount T may not suddenly change.

Therefore the engine ECU 1 executing the above injection amount correction processing can credibly prevent the unpredictable engine behavior caused by change to 'non-numeral' or 'infinity' of the correction coefficient Fsm as a control value that is computed through the smoothing processing. Furthermore, the processing involves no impact on the memory area and no suspension of the running engine.

Figure 7B:
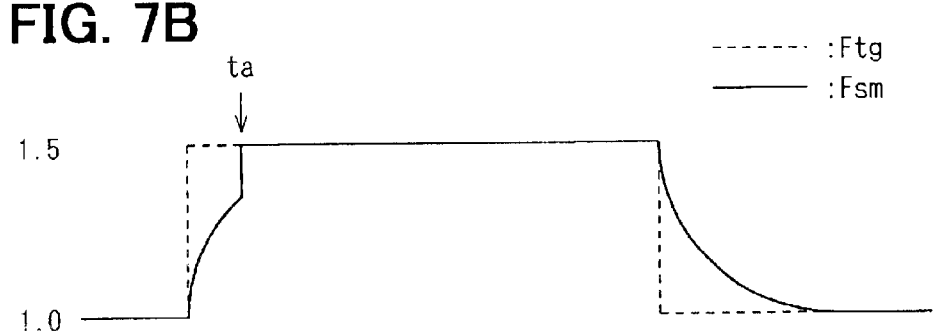
Figure 7C:
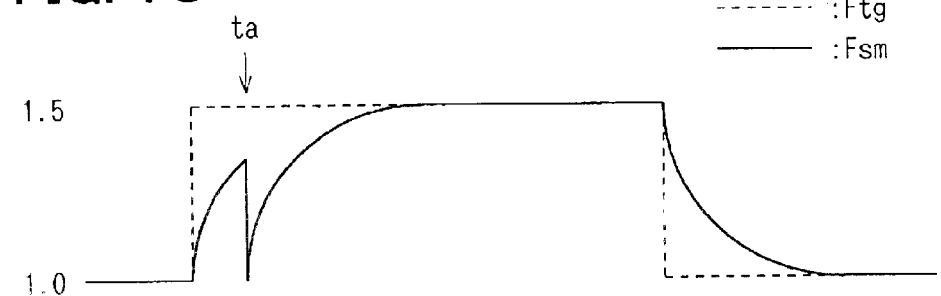

At step 270, the target value Ftg is substituted for the 'non-numeral' or 'infinity.' As shown at time ta in FIG. 7B, when the correction coefficient Fsm becomes 'non-numeral' or 'infinity' before the Fsm reaches the target value Ftg, the Fsm is quickly set to the Ftg. Thereby following up the target value Ftg of the Fsm is prevented from being retarded in comparison with that in a normal state. This enables the engine behavior as the control object to move quickly to the aimed state.

Figure 8B:
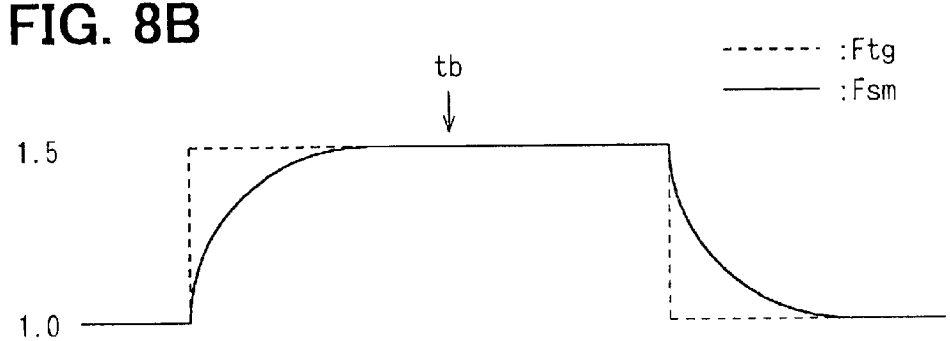

As shown at time tb in FIG. 8B, when the Fsm becomes 'non-numeral' or 'infinity' after the Fsm reaches the target value Ftg (1.5), the Fsm is reset to the same Ftg as in the normal state and the engine behavior is maintained in the same condition as in the normal state.

When at step 270 a preset fixed value is substituted for the Fsm instead of the target value Ftg, an unpredictable engine behavior is also prevented. However, this involves disadvantage that cannot obtain the effect shown in FIGS. 7B and 8B. For instance, when the fixed value is 1.0, as shown at the time ta in FIG. 7C the Fsm becomes 'non-numeral' or 'infinity' before it reaches the target value, the Fsm is once set to 1.0 and then approaches the target value Ftg (1.5).

Following up the target value Ftg of the Fsm is retarded more than that in the normal state and movement of the engine behavior to the aimed state may be thereby retarded. Specifically, in the state shown in FIG. 7C, the Fsm remains for a long period in a lower value than the target value Ftg, so that the fuel injection amount T is decreased and response to the full opening of the throttle valve probably becomes slower.

Figure 8C:
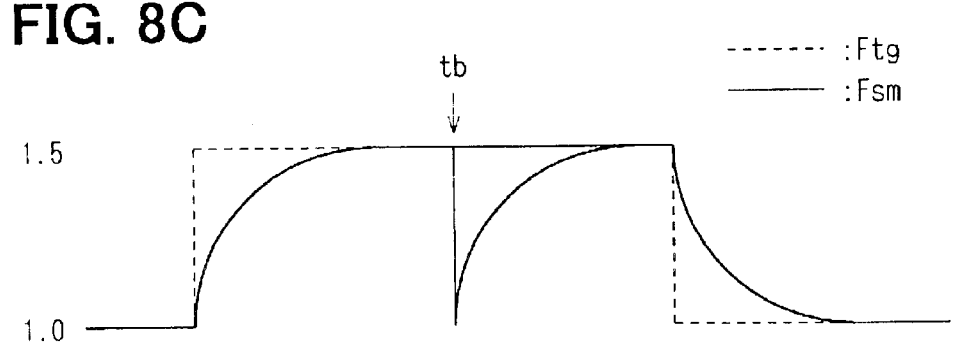

In FIG. 8C, the Fsm becomes 'non-numeral' or 'infinity' after it reaches the target value. The Fsm is set to 1.0 instead of the target value Ftg (1.5) and then approaches the target value Ftg (1.5) from the fixed value (1.0). The smoothing processing is thereby repeated again and the engine behavior should comparatively change from that in the normal state.

As explained above, when the correction coefficient Fsm becomes 'non-numeral' or 'infinity,' it is favorable that the target value Ftg is substituted for the Fsm instead of the fixed value. Incidentally, the correction coefficient Fsm corresponds to the control value used for controlling the in-vehicle systems as the control object.

The above embodiment may be modified as follows.

In the above check processing, both of the 'non-numeral' and 'infinity' are checked. However, only either 'non-numeral' or 'infinity' can be checked in the check processing. Furthermore whether the RamA or Fsm is at least either 'non-numeral' or 'infinity' can be determined at once when the datum format of the RamA and Fsm is a single precision floating point datum compliant with the IEEE 754. Namely, when the exponent part has '255,' the datum is determined to be at least either 'non-numeral' or 'infinity' regardless of its mantissa part's value. This determination method can be also applied to a double precision floating point mode datum.

The determinations in steps 100 and 110 in FIG. 4 can be performed after the computation processing in step 120. Similarly the determinations in steps 240 and 250 in FIG. 6 can be performed after the computation processing in step 260.

Figure 5A:
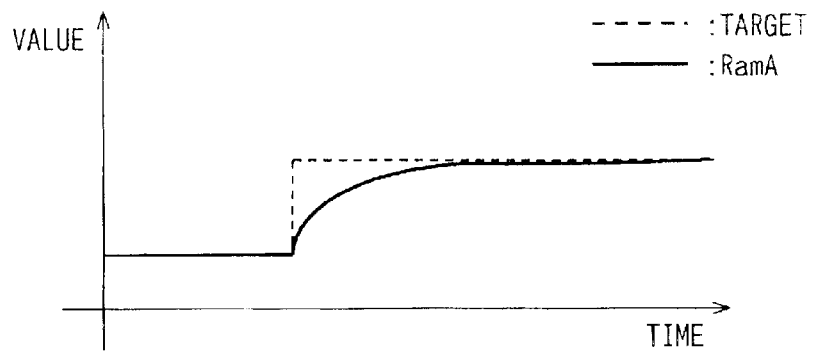
FIGS. 5A, 5B and 5C are diagrammatic graphs explaining a relationship between a target value and a computation result.
Figure 5B:
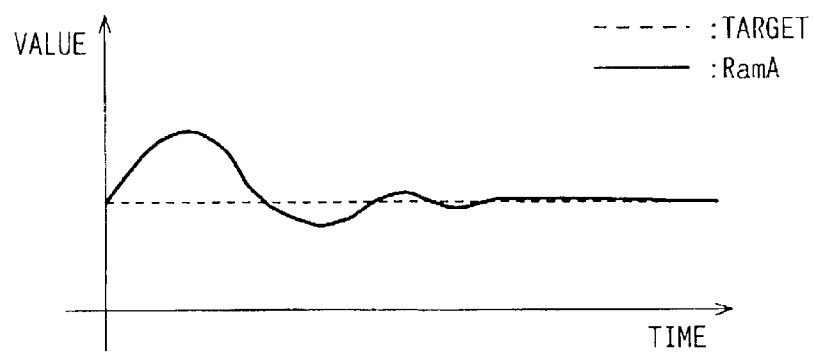
Figure 5C:
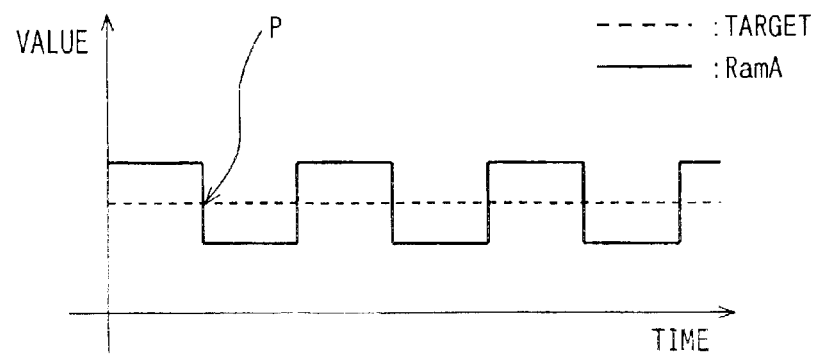

In the above embodiment, the smoothing computation is referred as an example. In the smoothing computation a computation result steadily converges on a target value as shown in FIG. 5A, so that the target value can be adopted as a default value. The target value can be also adopted as the default value in feedback control computation shown in FIG. 5B and oscillating computation shown in FIG. 5C in addition to the smoothing computation. In the feedback control computation based on the target value, a computation result RamA is converging on the target value. In the oscillating computation, a computation result RamA is oscillating around and inevitably passing through the target value at a point P shown in FIG. 5C.

What is claimed is:

1. An electronic control system that is provided with a floating point computation processor and executes a control program for a control object, the system comprising:

computing means for executing repetitive computation in the control program, wherein, in the computing means, a floating point mode datum is used and a preceding computation result of the floating point mode datum is used for computing a current computation result;

following-up means for making a computation result follow up a target value, wherein the computation result does not successively move away from the target value;

determining means for determining whether the preceding computation result is at least either non-numeral or infinity; and substituting means for substituting the target value as a default value for the preceding computation result when the preceding computation result is determined to be at least either non-numeral or infinity.

2. An electronic control system according to claim 1, wherein the following-up means is capable of making the computation result converge on the target value based on a deviation from the target value.

3. An electronic control system according to claim 1, wherein the following-up means oscillates the computation result on a basis of the target value in a vicinity of the target value.

4. An electronic control system according to claim 1, wherein the control object is an in-vehicle device provided in a vehicle, and wherein the computing means computes a control value, used for controlling the in-vehicle devices, as the computation result.

5. A control method that is for a control object and that is provided in an electronic control system that is provided with a floating point computation processor, the method comprising steps of:

executing repetitive computation, wherein, in the computation, a floating point mode datum is used and a preceding computation result of the floating point mode datum is used for computing a current computation result;

executing a following-up process that makes a computation result follow up a target value;

determining whether the preceding computation result is at least either non-numeral or infinity; and substituting the target value as a default value for the preceding computation result when the preceding computation result is determined to be at least either non-numeral or infinity.

6. A control method according to claim 5, wherein the following-up process makes the computation result converge on the target value based on a deviation from the target value.

7. A control method according to claim 5, wherein the following-up process oscillates the computation result on a basis of the target value in a vicinity of the target value.

8. A control method according to claim 5, wherein the control object is an in-vehicle device provided in a vehicle, and wherein the computation is for computing a control value, used for controlling the in-vehicle devices, as the computation result.

9. A computer program product in a computer-readable medium for use in an electronic control system that is provided with a floating point computation processor for controlling a control object, the computer program product comprising:

instructions for executing repetitive computation, wherein, in the computation, a floating point mode datum is used and a preceding computation result of the floating point mode datum is used for computing a current computation result;

instructions for executing a following-up process that makes a computation result follow up a target value;

instructions for determining whether the preceding computation result is at least either non-numeral or infinity; and instructions for substituting the target value as a default value for the preceding computation result when the preceding computation result is determined to be at least either non-numeral or infinity.

10. An electronic control system that is provided with a floating point computation processor and executes a control program for a control object, the system comprising:

computing means for executing repetitive computation in the control program, wherein, in the computing means, a floating point mode datum is used and a preceding computation result of the floating point mode datum is used for computing a current computation result;

following-up means executing a smoothing type process which makes a computation result follow up a target value, wherein the computation result does not successively move away from the target value;

determining means for determining whether the preceding computation result is at least either non-numeral or infinity; and substituting means for substituting the target value as a default value for the preceding computation result when the preceding computation result is determined to be at least either non-numeral or infinity.

11. A control method that is for a control object and that is provided in an electronic control system provided with a floating point computation processor, the method comprising:

executing repetitive computation, wherein, in the computation, a floating point mode datum is used and a preceding computation result of the floating point mode datum is used for computing a current computation result;

executing a smoothing type process that makes a computation result follow up a target value;

determining whether the preceding computation result is either non-numeral or infinity; and substituting the target value as a default value for the preceding computation result when the preceding computation result is determined to be either non-numeral or infinity.

* * * * *